United States Patent [19]
Okuda et al.

[11] Patent Number: 5,345,753
[45] Date of Patent: Sep. 13, 1994

[54] SILENT CHAIN

[75] Inventors: Tomonori Okuda; Tetsuji Kotera; Kouji Morishige, all of Nabari, Japan

[73] Assignee: Borg-Warner Automotive, K.K., Nabari, Japan

[21] Appl. No.: 98,433

[22] Filed: Jul. 28, 1993

[51] Int. Cl.$^5$ .................. F16G 13/00; F16G 13/06
[52] U.S. Cl. ............................... 59/5; 59/78; 474/213; 474/215
[58] Field of Search ............... 474/206, 212, 213, 214, 474/215, 216, 217; 59/5, 6, 8, 78

[56] References Cited

U.S. PATENT DOCUMENTS

| | | |
|---|---|---|
| 1,503,774 | 8/1924 | Stiansen ........................ 474/213 |
| 2,525,561 | 10/1950 | Pierce . |
| 2,602,344 | 7/1952 | Bremer . |
| 4,547,182 | 10/1985 | Rattunde . |
| 4,911,682 | 3/1990 | Ivey et al. . |
| 4,915,675 | 4/1990 | Avramidis . |
| 5,176,586 | 1/1993 | Sugimoto . |

FOREIGN PATENT DOCUMENTS

| | | |
|---|---|---|
| 51-1815 | 1/1976 | Japan . |
| 1-55821 | 11/1989 | Japan . |
| 210144 | 7/1992 | Japan ........................ 474/215 |

*Primary Examiner*—David Jones
*Attorney, Agent, or Firm*—Willian Brinks Hofer Gilson & Lione

[57] ABSTRACT

In a silent chain, guide link plates are installed in a row along the sides of the link plates. The guide link plates are provided with central openings having rounded corners. The width of the inner beam portion of the central opening is limited by the inner edge of the central opening and the inner edge of the guide link. The width of the outer beam portion of the central opening is limited by the outer edge of the opening and the outer edge of the guide link plate. The width of the inner beam portion is equal to or less than the width of the outer beam portion. Alternatively, the guide link plates are provided with slits extending from the inner edge, and the inner edges of said slits are curved.

4 Claims, 2 Drawing Sheets

SILENT CHAIN

The subject matter of this application was disclosed in Japanese application no. 2--400945 (Japanese publication no. 4-210144), which was published in Japan on Jul. 31, 1992.

BACKGROUND OF THE INVENTION

The present invention relates to silent chain, or chain with links having inverted teeth. Such chains are utilized with sprockets in automotive transmissions, transfer cases, engine timing systems, and the like. More particularly, the present invention relates to a silent chain in which the deformation of the guide link plates by a load is made substantially equal to the deformation of the inside link plates, which results in the decreased bending of the joining pins and minimizes the occurrence of fracture.

Silent chains are formed by the arrangement of link plates in lateral and longitudinal directions. The links are interlaced and joined by rocker pins. Guide links are utilized to maintain the links on the center of the sprockets when they are wound around the sprockets. Guide link plates, a, having the shape shown in FIG. 10, are typically installed in the center or at both edges of the row of link plates arranged in the lateral direction. The guide links are conventionally press fit over pins, which connect the interlaced inside or articulating links. Conventional guide plates "a" each have an inner edge facing a sprocket when wound therearound and an outer edge opposite to the inner edge, as shown in FIG. 10. The words "inner" and "outer" will hereinafter be used to define the location of the link portions with respect to the chain loop, namely, the words "inner" and "outer" respectively refer to the inner side and the outer side of the chain loop.

When load is applied to such a silent chain, a deformation moment, directed as shown by an arrow in FIG. 1, acts upon the inside or articulating link plate and causes the deformation of the link plate, as shown by the broken line in the same figure. This deformation is due to the presence of the crotch portion located between the two inverted teeth.

However, because a conventional guide link plate, a, as shown in FIG. 10, does not have inverted teeth or a crotch, its deformation is small compared with that of the inside link plate, and the difference in the deformation between the link plate and guide link plate can easily lead to the bending of the rocker pin and its fracture.

One of the prior art methods developed to overcome the drawback described above is disclosed in Examined Japan Patent Application 51-1815. According to this method, a guide link plate is used, which is provided with a depression or indentation at its outer edge (an edge opposite to the side at which the crotch or depression of the inside link plate is formed). This approach equalizes the deformations in the direction of the chain pitch line, but results in the twisting of the rocker pin because the deformation moments acting upon the link plate and guide link plate are directed in opposite directions. This twisting of the rocker pin can easily result in its fracture.

According to another conventional method disclosed in Examined Japan Patent Application 1-55821, one link plate is installed at the inner side of the outer guide link plate to prevent the contact damage of the rocker pin. This method, however, fails to completely solve the basic problem because it does not eliminate the difference in deformations of the guide link plate and link plate. Moreover, the addition of the link plate increases the width and weight of the chain for the same nominal transmission load.

Other prior art patents have addressed the unequalized loading of the pins in a silent chain. For example, U.S. Pat. No. 4,915,675 to Avramidis, which is incorporated herein by reference, teaches that loading across the pins should be equalized by matching the elastic deformation of the guide links to the elastic deformation of the inside links. U.S. Pat. No. 4,915,675 discloses, in various embodiments, the use of kidney shaped guide links as well as guide links of different thickness to match the stiffness or elasticity of the two outside guide links with the plurality of inside links in the adjacent rows. In accordance with the lacing pattern, the guide link is constructed to match the loading across the pins and the two guide links on a pin elastically deform substantially equally with the plurality of inside links.

Similarly, U.S. Pat. No. 2,602,344 to Bremer teaches that the loading across the pins should be equalized. U.S. Pat. No. 2,602,344 teaches a keyhole shape or removal of material to form a crotch in the guide link to achieve an equalized load through matching of the load deflection of the guide links and articulating links.

U.S. Pat. No. 5,176,586 to Sugimoto utilizes the same concepts taught in U.S. Pat. Nos. 4,915,675 and 2,602,344 to provide an equal load distribution. U.S. Pat. No. 5,176,586 provides a guide link with a window hole in the central part of the guide link. The window hole provides a guide link with a stiffness that will equalize the load across the pin in the same manner as taught in the other prior art patents. The present invention utilizes these same concepts to provide an equal load distribution through a guide link with a specially shaped crotch or central window hole.

SUMMARY OF THE INVENTION

The object of the present invention is to equalize the load-induced deformation of the guide link plate and the deformation of the inside link plate and thus minimize the bending and twisting stresses applied to the joining pins. Equalized load distribution will prevent their fracture and, at the same time, prevent the increase in chain wear caused by the increase in the local contact pressure between the joining pins and the link plates.

According to a first embodiment of the present invention, a silent chain has a plurality of inside link plates, with each inside or articulating link plate having a pair of teeth and a pair of apertures or pin holes. The links are arranged in lateral and longitudinal directions and joined by joining pins inserted in the pin holes. Guide link plates are located in a row of link plates in the lateral direction, and press fit on the pins. The aforementioned guide link plates are provided with central openings with rounded corners, and the width of the inner beam portion, limited by the inner edge of the opening and inner edge of the guide link plate, is equal to or less than the width of the outer beam portion, limited by the outer edge of the central opening mentioned above and the outer edge of the guide link plate.

According to a second embodiment of the present invention, a silent chain has a plurality of link plates. Each of the link plates has a pair of teeth and a pair of pin holes. The link plates are arranged in the lateral and longitudinal directions and joined by joining pins inserted in the pin holes. Guide link plates installed in a row of the link plates in the lateral direction and press fit on the pins. The guide plates are provided with slits extending from the inner edge to the central portion of the link, and the inner edges of these slits are curved.

In the structure described above, the guide link plate has a guiding function. Therefore, when the silent chain is wrapped around a sprocket, the silent chain is guided so as to prevent its disengagement from the sprocket. Moreover, when a load is applied to a silent chain, the elongation of the guide link plate is substantially the same as that of the link plate, and the guide link plate and link plate are deflected in the same direction. Hence, the bending and twisting stresses acting upon the joining pins can be minimized and the fracture of the joining pin can be significantly decreased.

DETAILED DESCRIPTION OF THE DRAWINGS

Figure 1:
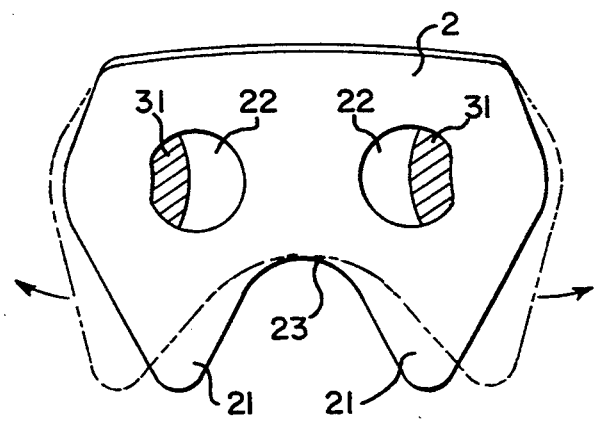
FIG. 1: Side view of the inside link plate used in a silent chain according to the present invention.
Figure 2:
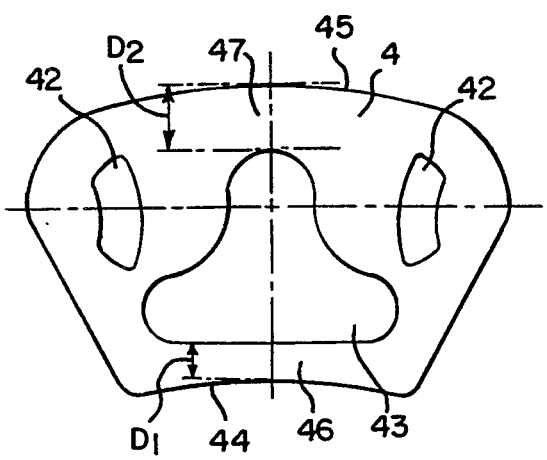
FIG. 2: Side view of the guide link plate used in a silent chain according to the present invention
Figure 3:
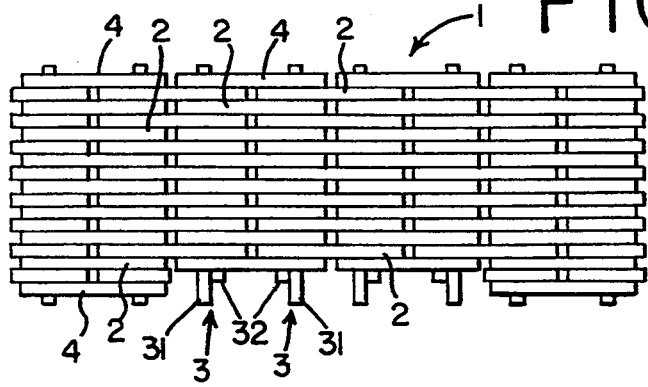
FIG. 3: Plan view of a portion of the silent chain according to the present invention
Figure 4:
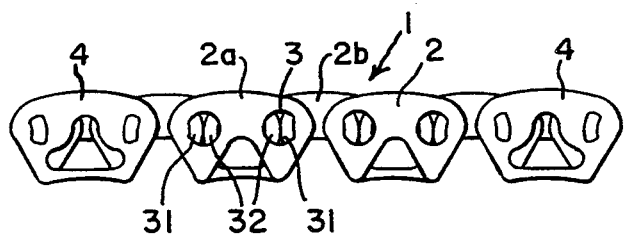
FIG. 4: Side view of the silent chain shown in FIG. 3, with some of the guide links removed.

The present invention is explained below with reference to the embodiments illustrated by the attached figures. FIGS. 1–4 illustrate a silent chain according to the first embodiment of the present invention. In silent chain 1 according to this example, link plates 2 are provided with a pair of teeth 21 and a pair of pin holes 22, as shown in FIG. 1. The links are arranged in the lateral and longitudinal direction, as shown in FIG. 3 and FIG. 4, and joined by rocker joints 3 consisting of rocker pins 31 and 32 which are inserted in the pin holes. Guide link plates 4, having a shape shown in FIG. 2, are installed at both ends of the lateral row of link plates and both ends of rocker pins 31 and are press fit and fixed in the guide link plates. Furthermore, similar to a conventional silent chain, rocker pins 31 are fixed to the respective link plates in the lateral row (FIG. 4) of link plates 2a, and rocker pins 32 are fixed to the respective link plates in the lateral row of link plates 2b, thus providing for rolling movement of the rocker joint. In this example of the present invention, a rocker pin was used as a joining pin. However, a round pin and associated round aperture can be also used for the purpose of the present invention.

The structure described above of the link plates and rocker Joints is similar to those in the conventional chain, and the specific feature of this example is in the structure of guide link plates 4. Thus, as FIG. 2 shows, guide link plate 4 is similar to the conventional guide link plate in that it has a ring-like outside shape and is provided with a pair of pin holes 42 for rocker pins. The difference between the guide link plate according to this example and that of the conventional structure is the presence of central opening 43. In order to prevent the concentration of stresses, the contour of this opening is formed by a straight line and curves which are smoothly connected with this straight line. The size and position of this opening are determined so that the width $D_1$ of beam portion 46 limited by the inner edge of opening 43 and the inner edge of guide link plate 44 is equal to or less than width $D_2$ of beam portion 47 limited by the outer edge of said opening 43 and outer edge 45 of the guide ink plate. Each beam portion is the solid or body portion of the guide link which is located between each edge of the link and the edge of the central opening.

Figure 5:
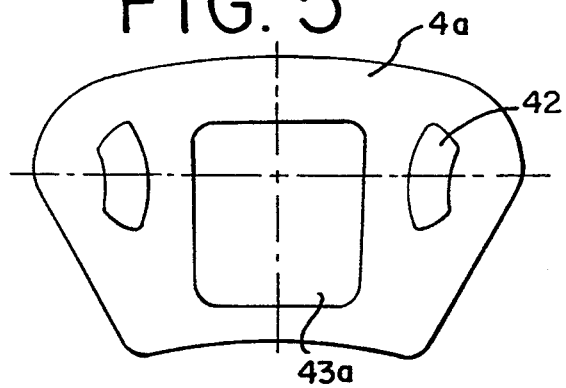
FIG. 5: Side view of the modification of the guide link plate

When a load is applied to a silent chain containing guide link plates 4 having the shape described above, the elongation of the guide link plates is substantially the same as that of link plates 2, and their deflection has the same direction (direction shown by an arrow in FIG. 1) and almost the same value. Therefore, the effect of the bending moment caused by the difference between the elongations of guide link plate 4 and link plate 2 and the effect of the twisting moment on rocker pins 31 and 32 are eliminated. As a result, the fracture of rocker pins induced by bending and twisting stresses is also prevented. The shape of the opening described above and shown in FIG. 2 is not necessarily the only possibility. Thus, the opening shown in FIG. 5 or other opening can be used provided the relation described above between the widths of the inner and outer beam portions is satisfied. In the example shown in FIG. 5, guide link plate 4a is provided with square or rectangular opening 43a having rounded corners.

Figure 6:
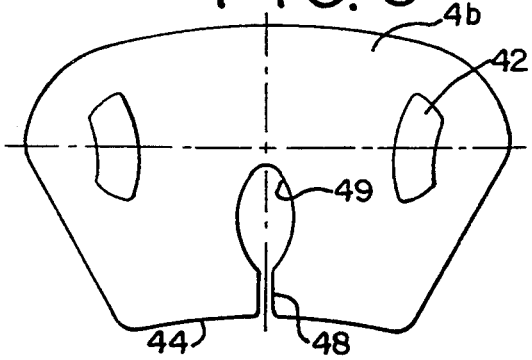
FIG. 6: Side view of another embodiment of the guide link plate
Figure 7:
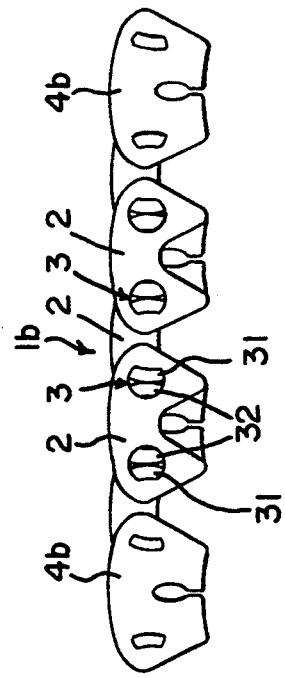
FIG. 7: Side view of the silent chain using the guide link plate shown in FIG. 6

FIG. 6 and FIG. 7 illustrate another example of the present invention. In this example, slit 48 extending in the direction from inner edge 44 to the center of the link is provided in guide link plate 4b. The inner end of slit 48 is provided with curved surface 49 to prevent the concentration of stresses. The depth of this slit is determined so as to obtain about the same elongation and about the same deflection in the same direction (shown by and arrow in FIG. 1) for the guide link plates 4b and the inside link plates 2 when a load is applied to silent chain 1b. Furthermore, the width of the slit is less than the thickness of the sprocket tooth in order to maintain the guiding function of the guide link plate.

Figure 8:
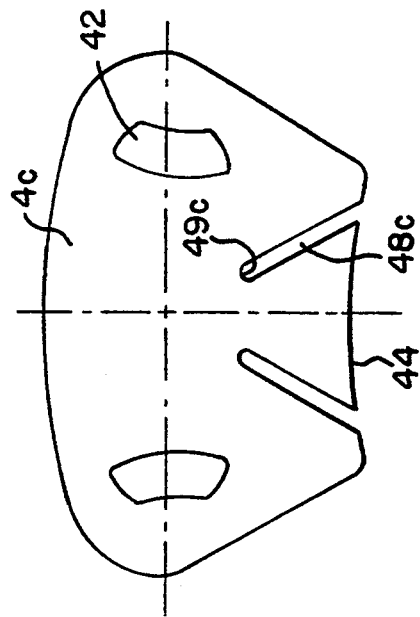
FIG. 8: Side view of still another embodiment of the guide link plate
Figure 10:
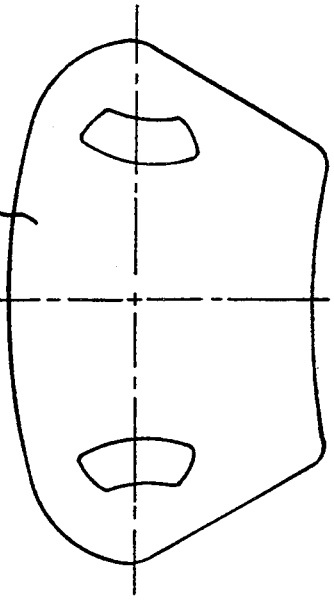
FIG. 10: Side view of the conventional guide link plate
Figure 9:
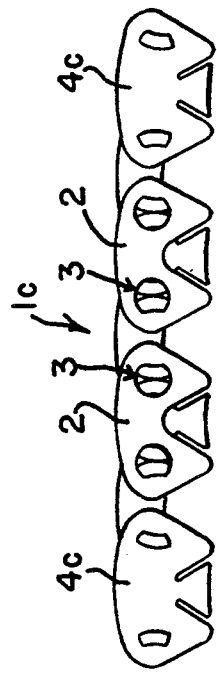
FIG. 9: Side view of the silent chain using the guide link plate shown in FIG. 8

FIG. 8 and FIG. 9 illustrate still another example of the present invention. In this example, guide link plate 4c is provided with two inclined slits 48c extending from inner edge 44 to the outer edge. The inner end of slits 48c is provided with curved surface 49c to prevent the concentration of stresses. The depth of these slits is determined so as to obtain about the same elongation and about the same deflection in the same direction (shown by and arrow in FIG. 1) for the guide link plates 4c and inside link plates 2 when a load is applied to silent chain 1c.

When silent chain 1, 1b and 1c having the structure described above are wound around sprockets (not shown) to transmit power, the power transmission is performed by link plates 2, and guide link plates 4, 4a, 4b, and 4c are provided to prevent the falling of the silent chain from the sprocket. When a load is applied to the silent chain, the elongation of guide plates 4, 4a, 4b and 4c is about the same as the elongation of link plates 2, and they are subjected to the deformation moment directed in the same direction and resulting in deflection in the same direction. Therefore, bending and twisting stresses have practically no effect on the rocker pins, and the fracture of rocker pins caused by such stresses is prevented.

The fracture of rocker pins caused by bending and twisting stresses can be prevented, therefore a lightweight chain having the same size as a conventional silent chain and suitable for large loads, can be manufactured.

What is claimed is:

1. A silent chain comprising:
   a plurality of interlaced inside link plates, said inside link plates having a pair of teeth and a pair of apertures, said inside link plates being interleaved and interconnected by pins inserted in said apertures,
   a plurality of guide link plates, said guide link plates being placed on the outside of said pins,
   said guide link plates having a body with an inner edge and an outer edge, a pair of apertures and an opening being substantially triangular in shape with rounded corners,
   said triangular opening being located between said pair of apertures and at a distance from said inner edge and at a distance from said outer edge, the distance between said central opening and the inner edge of said guide link being less than the distance between said central opening and the outer edge of said guide link, said central opening extending beyond a horizontal centerline connecting said pair of apertures.

2. A silent chain as defined in claim 1, wherein said pins are rocker joint pins.

3. A silent chain as defined in claim 2, wherein said triangular opening is symmetrical in shape with respect to a vertical centerline along the guide link between said pair of apertures.

4. A silent chain as defined in claim 3, wherein said triangular opening is defined by a straight base and concave sides.

* * * * *